United States Patent Office 3,195,343
Patented July 20, 1965

3,195,343
APPARATUS FOR THE THERMOGRAVIMETRIC DETERMINATION OF THE DISTILLATION CHARACTERISTICS OF LIQUIDS
Ferenc Paulik, 7 Liptak Lajos utca, Jenö Paulik, 57a Vecsey utca, and László Erdey, 16 Toldy Ferenc utca, all of Budapest, Hungary
Filed Aug. 28, 1961, Ser. No. 134,283
3 Claims. (Cl. 73—17)

This application is a continuation-in-part of Serial No. 78,951, filed December 28, 1960, now Patent No. 3,135,-107, June 2, 1964.

The above patent relates to a method for the evaporation testing of liquids in which the substance being tested is placed in a suitably shaped metal vessel which is attached to an arm of a balance by means of a porcelain rod provided with two longitudinal passages. The liquid is evaporated by heating and the loss, the rate of loss of weight, is measured. The heat necessary for the evaporation of the liquid is conducted to the liquid from an electrical heating body by means of the metal vessel and an attached projection. In order that the vapour should not condense upon the surface of the distillation apparatus, or should not be allowed to overheat, and so that the thermoelement measures the equilibrium temperature of the liquid-vapour system, the temperature of the air-space surrounding the distillation apparatus must be adjusted by a second electric oven to such an extent that the temperature of the outer air-space lies a few degrees lower than that the vapour-space. This is rather difficult to bring about.

The present invention consists in a device with a double-walled distillation apparatus evacuated between the walls which allows the temperature in the outer air space to vary by ±20-30° C. from that of the inner vapour space. The heating adjustment in the oven can now be carried out with a simpler program controller than hitherto without the danger of the vapour condensing on the walls and being cooled, or of it being overheated, so that the equilibrium temperature of the liquid vapour system is measured inexactly.

Figure 1:
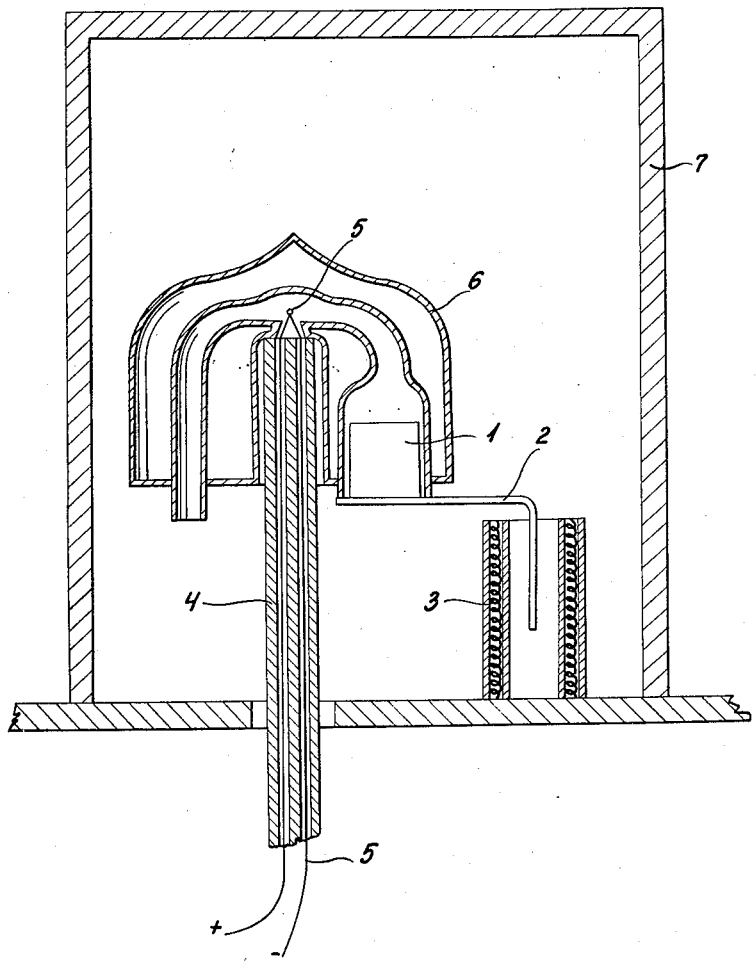
Figure 2:
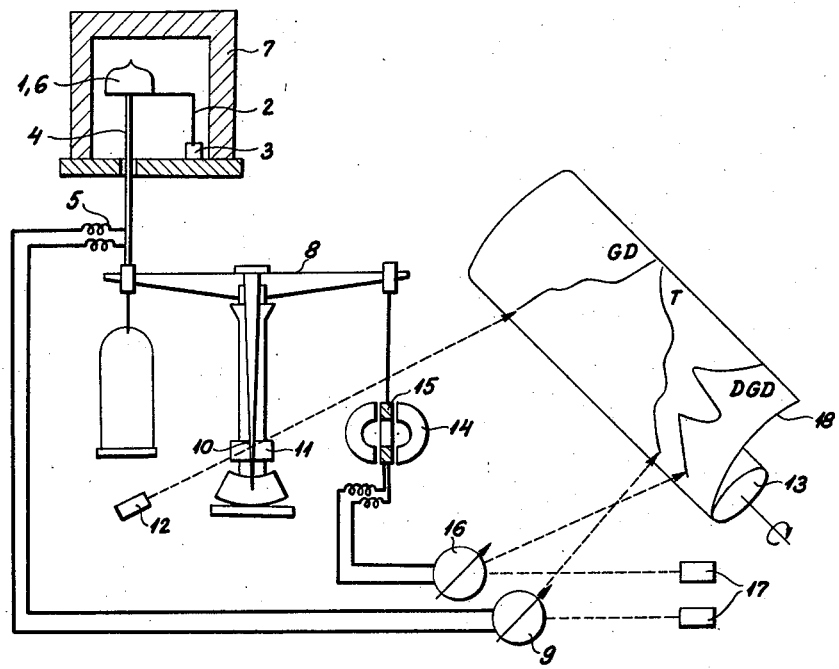

The invention will be more fully described with reference to the accompanying drawings in which FIG. 1 shows the double-walled evaporating vessel according to the present invention in vertical sectional view, and FIG. 2 is a diagrammatical view of the whole liquid evaporation testing apparatus.

Evaporation testing of a liquid takes place by simultaneous measurement of the amount of change in weight of the liquid, the rate of this weight-change and the equilibrium temperature of the vapor escaping from the liquid.

Considering now FIG. 1, a metal vessel 1 is thermally connected by conductive member 2 to heating means 3. Porcelain rods 4 have two longitudinal passages for the thermoelement 5. The double-walled cap 6 is evacuated to impede conduction of heat and if desired may be provided with an inner heat-reflecting coating. The distillation apparatus is surrounded by another oven 7 which is electrically heated.

The vessel 1 loads the arm 8 of the beam in a thermobalance of the type known per se (FIG. 2) by means of said porcelain rod 4, so that the weight of the vaporized liquid escaping may be continually measured. Simultaneously the temperature of the escaping vapor may also be measured with the help of galvanometer 9 linked to the thermocouple 5.

Owing to the use of the double-walled cap 6 the heating of oven 7 may easily be so controlled that the temperature in the space of oven 7 may vary by ±20 to 30°.

The conducting away of the current of the thermocouple assembly mounted upon the balance beam must be carried out in such a way that the balance movements are not hindered. This can be done in a way free from torsion through fine metal filaments which are fastened in the direction of the swinging axis of the balance.

The sensitivity of the balance must be decreased before beginning the measurement in proportion to the change in weight anticipated and to the weight of liquid taken, so that the balance accommodates the whole change in weight within one swing. This decreasing of the balance sensitivity can be carried out, for example by calibrated control weight placed on the balance pointer 10.

The swing of the balance may be recorded automatically most simply by fastening a slotted plate 11 to the balance pointer 10 illuminated by lamp 12, so that the amplitude of the light signals, magnified through an optical arrangement is projected upon a photorecording roller 13 and draws the gravimetric distillation curve GD. The temperature in the vapor space measured by the thermocouple and galvanometer 9 may equally well be recorded photographically upon the same photorecording roller 13, designating the temperature curve T.

The derivation of the weight curve is carried out by means of an apparatus as described in Patent No. 3,045,-472 having to this aim a permanent magnet or an electromagnet 14, either hanging from the balance beam with a fixed coil 15 surrounding it, or vice versa. The movable magnet induces in the coil an electrical voltage proportional to the balance movement. The light-beam of a galvanometer 16 connected to the poles of the coil is thrown by lamp 17 to the galvanometer mirror and acts as an indication of the derivative weight curve DGD upon the light sensitive paper 18.

What we claim is:

1. In a device for the thermogravimetric determination of the distillation characteristics of liquids, vessel means in which a liquid is placed, heating means, means thermally connecting said heating means with said vessel means, double-walled distillation means carrying said vessel means, said distillation means having a vapor space therein, balance means having arms, rod means having one end connected to one of said arms of said balance and the other end carrying said distillation means, thermo-element means carried by said rod means and disposed in said vapor space to measure the equilibrium temperature of the liquid-vapor phase in said vapor space, and indicator means responsive to said thermoelement means and to said balance means to indicate said distillation characteristics.

2. In a device according to claim 1 in which the walls of said distillation means have a heat-reflecting coating thereon.

3. In a device according to claim 1 in which said vessel means, heating means and distillation means are surrounded by an electrically heated oven means to maintain the temperature exterior of said distillation means a few degrees lower than that of said vapor space.

References Cited by the Examiner
UNITED STATES PATENTS
1,917,272  7/33  Podbielniak _____ 73—25 X OTHER REFERENCES
Powell: J. Sci. Instr., 34, June 1957 (pp. 225 to 237 relied on).
Waters: Analytical Chemistry, vol. 32, No. 7, June 1960 (pp. 852–858 relied on).

RICHARD C. QUEISSER, *Primary Examiner.*
ROBERT L. EVANS, *Examiner.*